United States Patent
Gurny et al.

(10) Patent No.: US 8,736,846 B2
(45) Date of Patent: May 27, 2014

(54) OPTICAL SENSOR DEVICE

(75) Inventors: Eric Gurny, Saarlouis (DE); Alexandre Obotnine, Toronto (CA)

(73) Assignee: Werth Messtechnik GmbH, Giessen (DE)

( * ) Notice: Subject to any disclaimer, the term of this patent is extended or adjusted under 35 U.S.C. 154(b) by 736 days.

(21) Appl. No.: 12/738,159

(22) PCT Filed: Oct. 10, 2008

(86) PCT No.: PCT/EP2008/008581
§ 371 (c)(1),
(2), (4) Date: Jul. 13, 2010

(87) PCT Pub. No.: WO2009/049834
PCT Pub. Date: Apr. 23, 2009

(65) Prior Publication Data
US 2011/0037987 A1 Feb. 17, 2011

(30) Foreign Application Priority Data

Oct. 16, 2007 (DE) .................... 20 2007 014 435 U

(51) Int. Cl.
*G01B 11/02* (2006.01)
(52) U.S. Cl.
USPC ........................................... 356/497
(58) Field of Classification Search
USPC .................. 356/496, 497, 479, 511
See application file for complete search history.

(56) References Cited

U.S. PATENT DOCUMENTS

| | | | |
|---|---|---|---|
| 3,899,253 A * | 8/1975 | Overhoff | 356/497 |
| 4,530,097 A * | 7/1985 | Stokes et al. | 372/6 |
| 4,886,362 A | 12/1989 | Oono | |
| 4,908,951 A | 3/1990 | Gurny | |
| 4,997,274 A | 3/1991 | Takakusagi et al. | |
| 5,165,063 A | 11/1992 | Strater et al. | |
| 5,785,651 A | 7/1998 | Kuhn et al. | |
| 6,327,041 B1 | 12/2001 | Guern | |
| 6,661,513 B1 * | 12/2003 | Granger | 356/328 |
| 6,940,596 B2 * | 9/2005 | Uhrich et al. | 356/369 |
| 7,301,644 B2 * | 11/2007 | Knighton et al. | 356/479 |
| 2005/0030528 A1 | 2/2005 | Geffen et al. | |
| 2005/0105090 A1 * | 5/2005 | Piwonka-Corle et al. | 356/369 |
| 2006/0109483 A1 | 5/2006 | Marx et al. | |
| 2007/0127033 A1 | 6/2007 | Ueno | |
| 2007/0148792 A1 | 6/2007 | Marx et al. | |

FOREIGN PATENT DOCUMENTS

| | | |
|---|---|---|
| DE | 38 06 6861 | 9/1989 |
| EP | 0 330 901 | 2/1989 |
| JP | S63-47606 | 3/1988 |

(Continued)

*Primary Examiner* — Tarifur Chowdhury
*Assistant Examiner* — Jonathon Cook
(74) *Attorney, Agent, or Firm* — Preti Flaherty Beliveau & Pachios LLP

(57) ABSTRACT

An optical sensor device (38) for use in a measuring and/or inspection apparatus comprises an optical sensor head (40) including a white light sensor (44) having a wideband radiation source (50), a wavelength-sensitive receiver (52) and a beam splitting means (60); and an objective (46) for directing a measuring beam onto an object to be measured and detecting a reflection beam reflected from the object to be measured. The optical sensor device (38) further comprises a video sensor (80), wherein the beam path of the video sensor (80) passes through the same objective (46) as that of the white light sensor (44) of the optical sensor head (40).

23 Claims, 7 Drawing Sheets

(56) References Cited

FOREIGN PATENT DOCUMENTS

| JP | S63-279103 | 11/1988 |
| JP | S64-74408 | 3/1989 |
| JP | H10-9827 | 1/1998 |
| JP | 2000-294608 | 10/2000 |
| JP | 2002-517742 | 6/2008 |
| JP | 2008-146060 | 6/2008 |
| WO | WO 88/10406 | 12/1988 |
| WO | WO 96/41123 | 12/1996 |
| WO | WO 03/036227 | 5/2003 |
| WO | WO 03/052342 | 6/2003 |
| WO | WO 2008/129073 | 10/2008 |

* cited by examiner von 52 →

OPTICAL SENSOR DEVICE

BACKGROUND OF THE INVENTION

1. Field of the Invention

The present invention refers to an optical sensor device, especially to an optical sensor device for use in a measuring and/or inspection apparatus.

2. Description of the Prior Art

Such an optical sensor device is suitable in particular for use in multi-coordinate measuring devices (CMD) having tactile, exchangeable sensors, but it can also be used in another structural form in relation to optical CMDs, multi-sensor CMDs, microscopes and other optical measuring and/or testing systems or apparatuses/devices.

Multi-coordinate measuring apparatuses are well-known in various different forms in the state of the art. Here, a distinction is drawn between CMDs with predominantly tactile sensors and CMDs with optical sensors or multi-sensors, wherein, in the latter case, the sensors are fixedly integrated and are not exchangeable by means of a corresponding change device.

Such a multi-coordinate measuring apparatus is shown for example in DE 38 06 686 A1. In that apparatus, both a contact-free measurement of an object to be measured and also a mechanically touching measurement of an object are possible by means of a multi-sensor sensing system. An optical sensor device is provided for contact-free measurement, and a mechanical sensing head is provided for mechanically touching measurement. Besides a video sensor, the optical sensor device also has a laser sensor for automatic contour detection of the object to be measured. The laser sensor disclosed in DE 38 06 686 A1 follows the surface contour of the object at a constant spacing and thus provides for contour detection in virtually real time, with a high level of accuracy. In the scanning mode, the z-axis is continuously re-adjusted so that the laser sensor remains constantly adjusted in the focal plane. The laser sensor operates as a trigger scanner without a dedicated linear measurement range, that is to say the scanning accuracy depends only on the speed of travel of the optical sensor or the order of magnitude of the servo lag error. A further limitation in terms of measurement accuracy is formed by what are referred to as speckles which are produced upon focusing of the coherent laser beam on optically rough surfaces (unevenness of the order of magnitude of the wavelength) and cause difficulties with or make impossible evaluation of the measurement signal of the laser sensor.

It is also known in measurement technology for measurements to be carried out with so-called white light sensors in which the above-indicated problem of the speckle patterns does not arise. White light measuring systems of that kind conventionally comprise a sensor head connected to a control unit by way of a flexible optical fibre. The control unit includes the light source, the receiver in the form of a spectrometer, a measurement data evaluation means, a data interface to external devices and the power supply. Measurement systems of that kind, however, cannot be used as exchangeable sensors for CMDs as they cannot be automatically exchanged by virtue of the large-volume control unit and the fixed connection between the sensor head and the control unit. Further, the conventional white light sensors cannot be used as TTL sensors in combination with microscope measuring objectives. Combined use with other sensor types also seems not to be possible.

SUMMARY OF THE INVENTION

It is an object of the present invention to develop an enhanced optical sensor device which uses a white light source. It is a further object of the present invention to provide such an optical sensor device which can be employed in coordinate measuring apparatuses and is compatible with the existing hardware and software of such CMDs.

According to a first aspect of the present invention that object is attained by an optical sensor device for use in a measuring and/or inspection apparatus comprising: an optical sensor head including a white light sensor having a wideband radiation source (referred to as the white light source), a wavelength-sensitive receiver and a beam splitting means; as well as an objective for directing a measuring beam onto an object to be measured and detecting a reflection beam reflected from the object to be measured. The optical sensor device further comprises a video sensor, wherein the beam path of the video sensor passes through the same objective as that of the white light sensor of the optical sensor head.

The optical sensor device having such a structure is of a compact light design, and combines a white light sensor with a video sensor. The white light sensor operates in a similar manner to the laser sensor of the measuring apparatus described in DE 38 06 686 A1 as an autofocus or scanner for the video sensor, but without the above-mentioned disadvantages of the laser sensor (speckle patterns).

In a preferred configuration of the invention, the optical sensor device further comprises a beam splitter (or IR mirror) for reflecting the beam path of the white light sensor into the beam path of the video sensor which beam splitter is arranged between the video sensor and the objective. In that way the white light sensor can be compactly combined with a video sensor using the same objective so that, besides the advantages afforded by the use of the white light source, it is also possible to achieve those advantages as were achieved in the conventional measuring apparatus of DE 38 06 686 A1 by the combination of a laser sensor and a video sensor.

In a further configuration of the invention, the optical sensor device further comprises an electronic control and evaluation means for controlling said optical sensor head and evaluating the measurement signals produced by the white light sensor of the optical sensor head. This electronic control and evaluation means either may be formed as a separate component to the optical sensor head or may be formed integral to the optical sensor head.

In an alternative configuration of the invention, the optical sensor device further (integrally) comprises an electronic control and evaluation means for controlling the video sensor and the optical sensor head and evaluating the measurement signals produced by the video sensor and the white light sensor of the optical sensor head, respectively; and an exchange adaptor having connections for connecting the optical sensor device to a measuring and/or inspection apparatus.

According to a second aspect of the present invention the above-mentioned object is attained by an optical sensor device for use in a measuring and/or inspection apparatus comprising: an optical sensor head including a white light sensor having a wideband radiation source (referred to as a white light source), a wavelength-sensitive receiver and a beam splitting means, and an objective coupled to the white light sensor for directing a measuring beam onto an object to be measured and detecting a reflection beam reflected from the object to be measured. The optical sensor head further includes an electronic control and evaluation means for controlling the white light sensor and evaluating the measurement signals produced by the white light sensor, and an exchange adaptor having connections for connecting the optical sensor head to a measuring and/or inspection apparatus.

The optical sensor head of that optical sensor device having such a structure is of a compact, light design, includes all essential components for its mode of operation and can be used in all measuring and/or inspection apparatuses or testing systems with an automatic scanner or sensor exchanging device. The measurement data generated with the optical sensor head can be fully compatible with the measurement data which are produced for example by tactile sensors of the same measuring and/or inspection apparatus.

In a configuration of the invention the electronic control and evaluation means includes one or more amplifiers for amplification of the measurement signal produced by the wavelength-sensitive receiver of the white light source. Preferably, the amplifiers are high-gain amplifiers which are adjustable.

For achieving a robust function of the optical sensor device, preferably the wideband light source, the wavelength-sensitive receiver and/or the one or more amplifiers are temperature-controlled. The objective used for the optical sensor device may be a finite or infinite conjugated objective.

Preferably, the video sensor includes a CCD camera, a CMOS camera, a CCD/CMOS camera or the like.

In a configuration of the invention the wideband radiation source of the white light sensor comprises a wavelength-sensitive diode arrangement, an aperture and a chromatic lens arrangement, and the wavelength-sensitive receiver of the white light sensor comprises a chromatic lens arrangement, an aperture and a wavelength-sensitive photodiode arrangement. In that case the chromatic lens arrangements of the wideband radiation source and the wavelength-sensitive receiver can be formed for example by an aspheric lens or by two spherical lenses. The apertures of the wideband radiation source and the wavelength-sensitive receiver preferably have a diameter of about 3 to 6 µm.

In an alternative configuration of the invention, a polychromatic lens arrangement is arranged between the objective and the beam splitting means of the white light sensor, and the wideband radiation source and the wavelength-sensitive receiver of the white light sensor of the optical sensor head are coupled to the polychromatic lens arrangement by means of fiber optics. In that case, the polychromatic lens arrangement preferably comprises a first spherical lens for creating a chromatic aberration and a second spherical lens for removing a spherical aberration. Further, it is preferred that the fiber optics are formed as single mode fiber optics, that the fiber optics have a core diameter in the range of about 2 to 10 µm, preferably about 3 to 6 µm, that the beam splitting means is formed as a fiber optics coupler, and that an optical isolator is arranged between the beam splitting means and the wideband radiation source for allowing the light only to pass in the direction from the wideband radiation source to the beam splitting means.

In both above-mentioned configurations of the invention, the (poly)chromatic lens arrangements are designed as to allow the optical sensor head to be used in combination with a standard objective generally used for video sensors of measuring and/or inspection apparatuses.

In a further configuration of the invention the wideband radiation source of the white light sensor comprises one of a superluminescence diode (SLED) or a plurality of superluminescence diodes (SLEDs) having different wavelengths of radiation (preferably with complementary spectral ranges). Due to the plurality of superluminescence diodes having different wavelengths the measuring range is extended.

In a still further configuration of the invention, the wavelength-sensitive receiver of the white light sensor comprises a number of photodiodes or photodiode areas having different wavelengths of sensitivity (preferably with complementary spectral ranges).

BRIEF DESCRIPTION OF THE DRAWINGS

The foregoing and further features and advantages of the invention will be better understood from the description hereinafter of preferred non-limiting embodiments by way of example with reference to the accompanying drawings in which.

DETAILED DESCRIPTION OF PREFERRED EMBODIMENTS OF THE INVENTION

Figure 1:
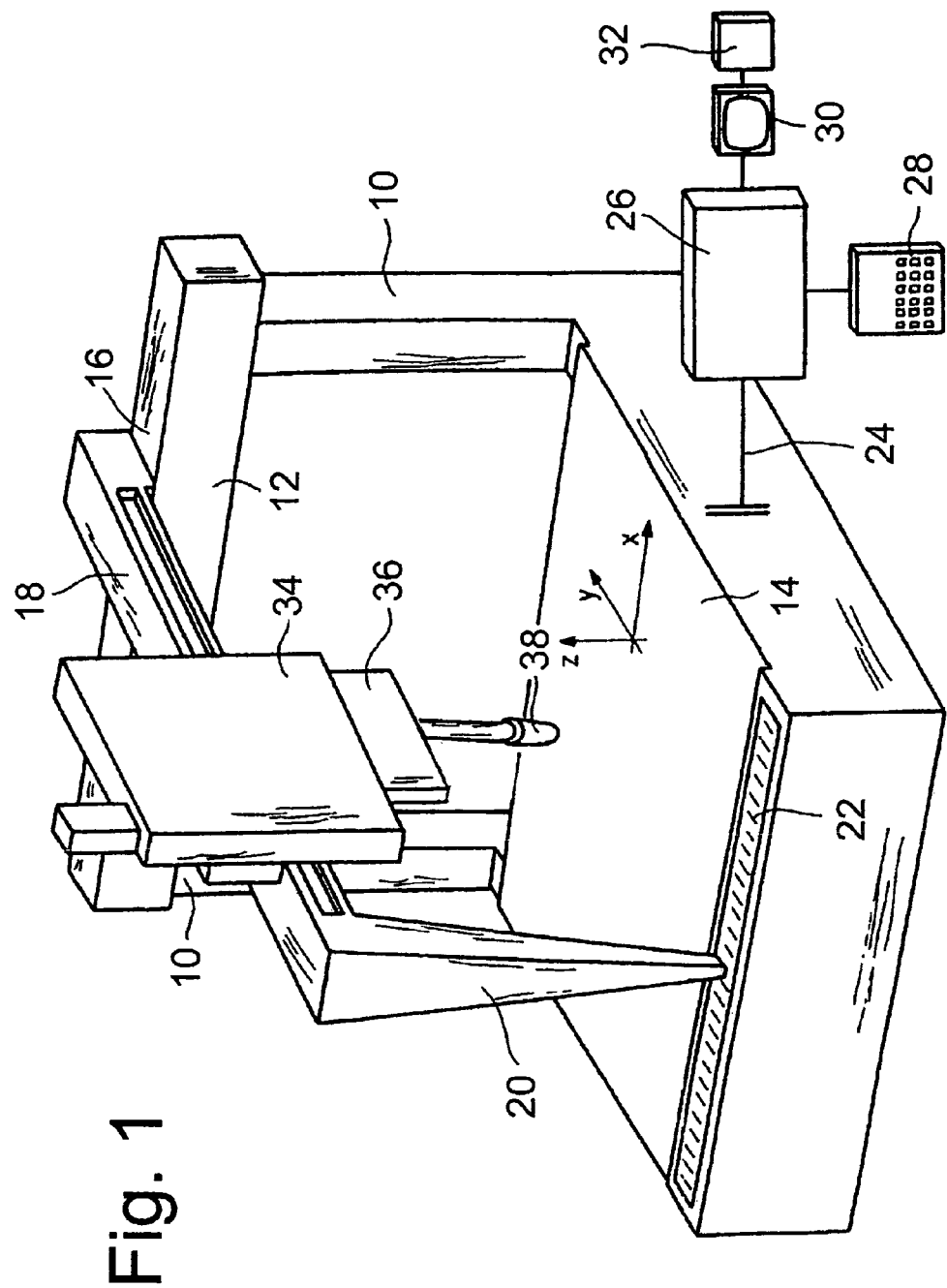
FIG. 1 shows a diagrammatic perspective view of a multi-coordinate measuring and/or inspection apparatus in which the present invention can advantageously be used.

Referring to FIG. 1 the structure of a multi-coordinate measuring apparatus (CMD) will firstly be described in greater detail by way of example, in which the optical sensor device of the present invention which is described hereinafter in detail can advantageously be used. It will be appreciated however that the present invention is not restricted to that specific multi-coordinate measuring apparatus but basically can be combined with any measuring apparatuses using an optical sensor device.

FIG. 1 is a perspective view showing the essential components of a multi-coordinate measuring apparatus. The measuring apparatus is a measuring machine which is constructed in form of a portal structure having a stationary portal formed from two side supports 10, a cross member 12 and a measuring table 14. The cross member 12 forms at the same time a first guidance 16 for a transverse carrier 18 which is supported by means of a support 20 on a second guidance 22 on the edge of the measuring table 14. The transverse carrier 18 can be displaced along the two guidances 16, 22 arranged in parallel relationship, until encountering end abutments (not shown) in the x-coordinate direction, over the measuring table 14. The measuring table 14 is for example in the form of a rotary measuring table and is fixed in the x-y-plane.

The measuring machine is connected by way of a signal line 24 to an evaluation and/or control unit 26. An input device 28 for the user, a monitor 30, a printer 32 and the like are in turn connected to the evaluation and/or control unit 26. Control of the components of the measuring machine and evaluation of the measurement signals are effected by that evaluation and/or control unit 26.

Mounted to the transverse carrier 18 of the measuring machine is a carriage 34 which is movable along the transverse carrier 18 in the y-coordinate direction. That carriage 34 carries a sleeve 36 displaceable in the z-coordinate direction. Alternatively two or more separate sleeves can also be mounted to the carriage 34 or two or more separate carriages which are movable in the y-coordinate direction and which each carry a respective sleeve can also be provided on the transverse carrier 18. In the last-mentioned case the various carriages can be actuated independently of each other.

An optical sensor device 38 which is in particular designed in accordance with the present invention is mounted to the lower end of the sleeve 36 (optionally the plurality of sleeves).

In an alternative configuration it is also possible for the multi-coordinate measuring apparatus to be provided with a measuring table 14 displaceable in the x-y-plane and a sleeve 36 fixed in the x-y-plane, whereby the same relative movements can be produced between an object to be measured on the measuring table 14 and the optical sensor device 38.

In one configuration, the optical sensor device 38 may be exchanged at any time and in any sequence to a tactile sensing device by way of the (preferably automatic) exchanging device of the measuring apparatus, to guarantee a high degree of flexibility in respect of the measurement tasks to be implemented. The combined use of the individual sensors or sensing devices means that complicated measuring tasks can also be carried out in a short time.

Figure 2:
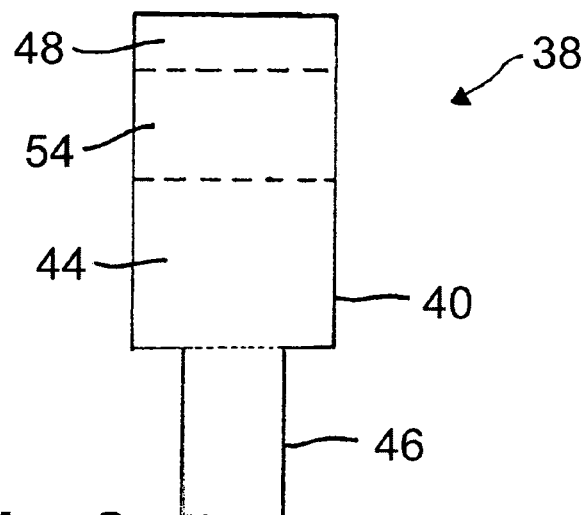
FIG. 2 shows a schematic block circuit diagram of the basic structure of an optical sensor device in accordance with a first embodiment of the present invention.
Figure 3:
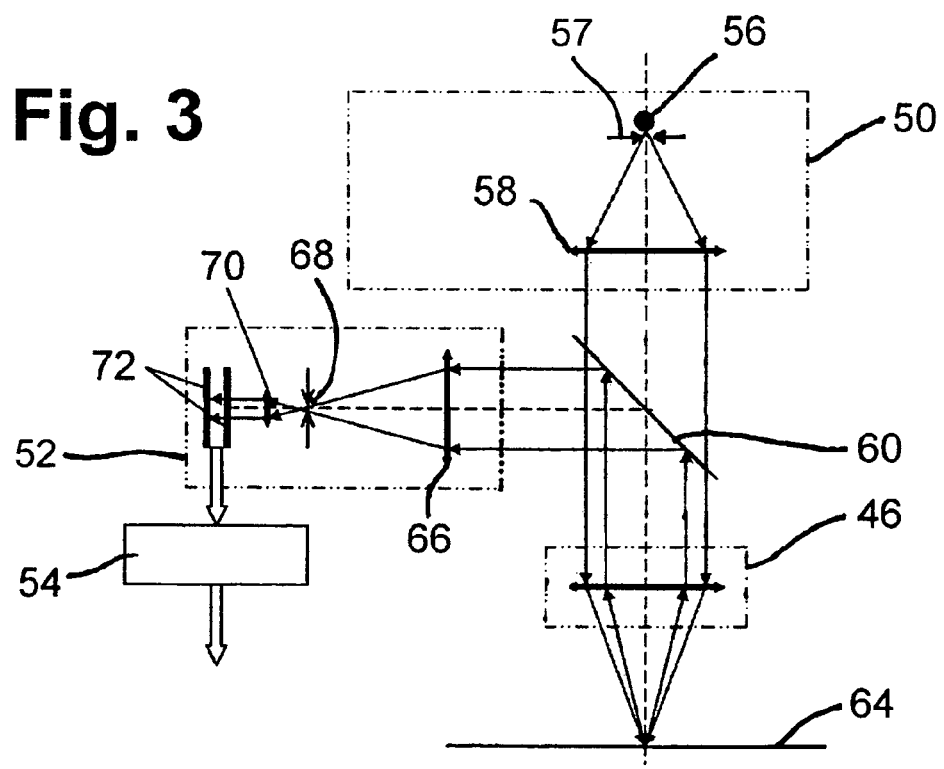
FIG. 3 shows a schematic block circuit diagram of the optical sensor device of FIG. 2.
Figure 4:
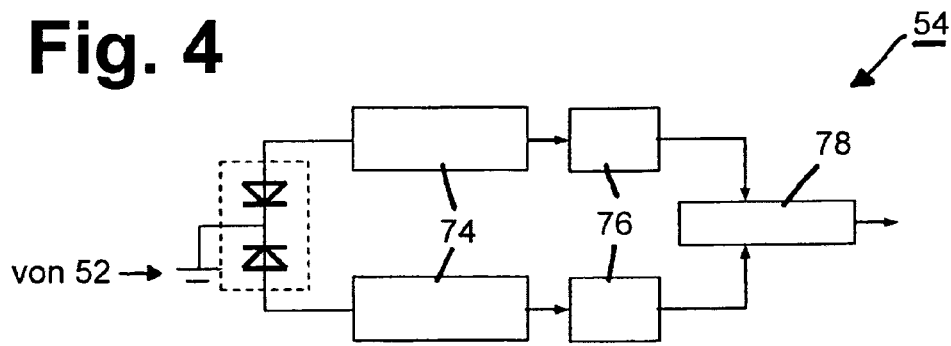
FIG. 4 shows a simplified block circuit diagram of an electronic control and evaluation means by way of example for the optical sensor device of FIGS. 1 and 2.

With reference to FIGS. 2 to 4, a first embodiment of an optical sensor device 38 of the invention is described in greater detail hereinafter, which can be used for example in the above-described multi-coordinate measuring apparatus.

The main component of the optical sensor device 38 is an optical sensor head 40. This optical sensor head 40 includes a white light sensor 44 having a light source and a receiver, an objective 46 coupled to the white light sensor 44, an electronic control and evaluation means 54, and an exchange adapter 48 (e.g. autojoint made by Renishaw plc). All those components of the optical sensor head 40 are disposed in a compact sensor housing. The exchange adaptor 48 has a plurality of connections (not shown) for connection to a measuring and/or inspection apparatus, which include in particular connections for the power supply to the optical sensor device 38 and signal transmission of measurement data of the optical sensor device.

The optical sensor device 38 of this embodiment is advantageously suitable for use with coordinate measuring and/or inspection machines with an automatic sensor exchanger. In particular, the optical sensor head 40 includes in a compact structure (small size, low weight) all main components such as a light source, a receiver and optical devices (described in detail hereinafter) and also an integrated electronic control and evaluation means 54 and the required interfaces in relation to the measuring apparatus by way of the exchange adaptor 48. The optical sensor device 38 can thus be used for the user in a similar fashion to conventional sensing heads in a measuring and/or inspection apparatus.

FIG. 3 shows the structure of the optical sensor device 38 of FIG. 2, more precisely of its white light sensor 44, in several individual units, with the exchange adaptor 48 having been omitted from FIG. 3 for the sake of simplicity.

The white light sensor 44 of the optical sensor head 40 has as main components a wideband radiation source (referred to as a white light source) 50 and a wavelength-sensitive receiver 52. The electronic control and evaluation means 54 is coupled to the receiver 52 and is described in greater detail hereinafter with reference to FIG. 4. The objective 46 is coupled to the white light sensor 44, too.

The wideband radiation source 50 has in particular a superluminescence diode (SLED) 56 for producing a polychromatic light beam (white light) of high light intensity per unit of area. The spectral bandwidth of the superluminescence diode used here is for example about 40 nm and the central wavelength is preferably in the range of between about 700 nm to 1500 nm, more preferably in the range between about 800 nm to 900 nm, and most preferably in the range between about 820 nm and 860 nm. The polychromatic light beams from the superluminescence diode 56 firstly pass through an aperture 57 having a very small diameter, preferably in the range of about 3 to 6 μm, to produce a light beam having a very small diameter.

After that aperture 57, a chromatic lens arrangement 58 converts the wave fronts of the point-form light source 56, 57 into flat wave fronts. The chromatic lens arrangement can be formed for example from an aspheric lens or two spherical lenses. The chromatic lens arrangement is designed for producing high longitudinal chromatic aberrations and minimal spherical aberrations resulting from focal points for various wavelengths along the main optical axis. Thus, an effective colour coding of the z-coordinate position of the object to be measured is achieved.

After passing through that first chromatic lens arrangement 58 the light beams pass through a beam splitter 60 and then through a lens arrangement of the objective 46 in order to be focused onto a measuring plane 64 of an object to be measured in the form of a small but intensive spot of light. The use of the aperture 57 after the SLED 56 in combination with the objective 46 produces a very small spot diameter which is important for high precision of the measurement carried out. Further, the components of the polychromatic light involving different wavelengths are focused onto different measuring planes 64.

After passing through the lens arrangement of the objective 46 the light beams reflected by the object to be measured impinge again on the beam splitter 60 and are diverted onto the wavelength-sensitive receiver 52.

After the beam splitter 60 the reflected light beams impinge in the receiver 52 on a further chromatic lens arrangement 66 which can be of a structure similar to the foregoing first chromatic lens arrangement 58 of the radiation source 50, comprising for example an aspheric lens or two spherical lenses. Disposed downstream of that chromatic lens arrangement 66 is an aperture 68 of a very small diameter of about 3 to 6 μm. Only light of a wavelength with a corresponding focus can respectively pass through the aperture opening, by virtue of this chromatic lens arrangement 66.

The light passing through the aperture 68, after passing through an achromatic lens 70, impinges on a wavelength-sensitive detecting means 72. That detecting means 72 has for example two photodiodes or two photodiode regions of which one has a boosted response in the red range and the other in the blue range so that two photoelectric currents are produced proportionally to the wavelength of the incident light. The ratio of the two photoelectric current strengths depends only on the wavelength of the incident light so that the focus of the measuring plane 64 and thus the z-coordinate of a measurement point on an object to be measured can be determined from that measurement signal.

The measurement signals (photoelectric currents) produced by the wavelength-sensitive detecting means 72 are passed to the electronic evaluation means 54 which is also integrated in the optical sensor head 40 of the present optical sensor device 38. As shown in FIG. 4, that electronic evaluation means 54, in an embodiment, includes two transimpedance amplifiers 74 for amplifying the very small measurement signals of the receiver 52, downstream of each of which is disposed a respective analog-to-digital converter 76. Alternatively, it is also possible to envisage using a logarithmic amplifier. The outputs of the two analog-to-digital converters 76 are then further processed in a microprocessor 78 and evaluated. That microprocessor 78 is connected to a data interface of the exchange adaptor 48.

The above-described white light sensor 44 having the white light source 50 and the wavelength-sensitive receiver 52 permits very precise and rapid coordinate detection of surfaces, without any problem, without being confused by speckles, as would be the case when using a laser sensor.

Figure 5:
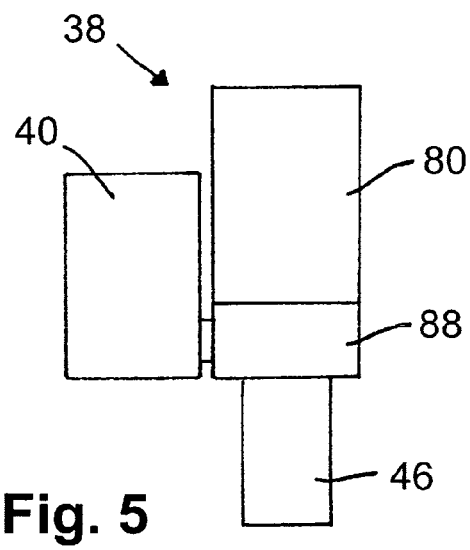
FIG. 5 shows a schematic block circuit diagram of the basic structure of an optical sensor device in accordance with a second embodiment of the present invention.
Figure 6:
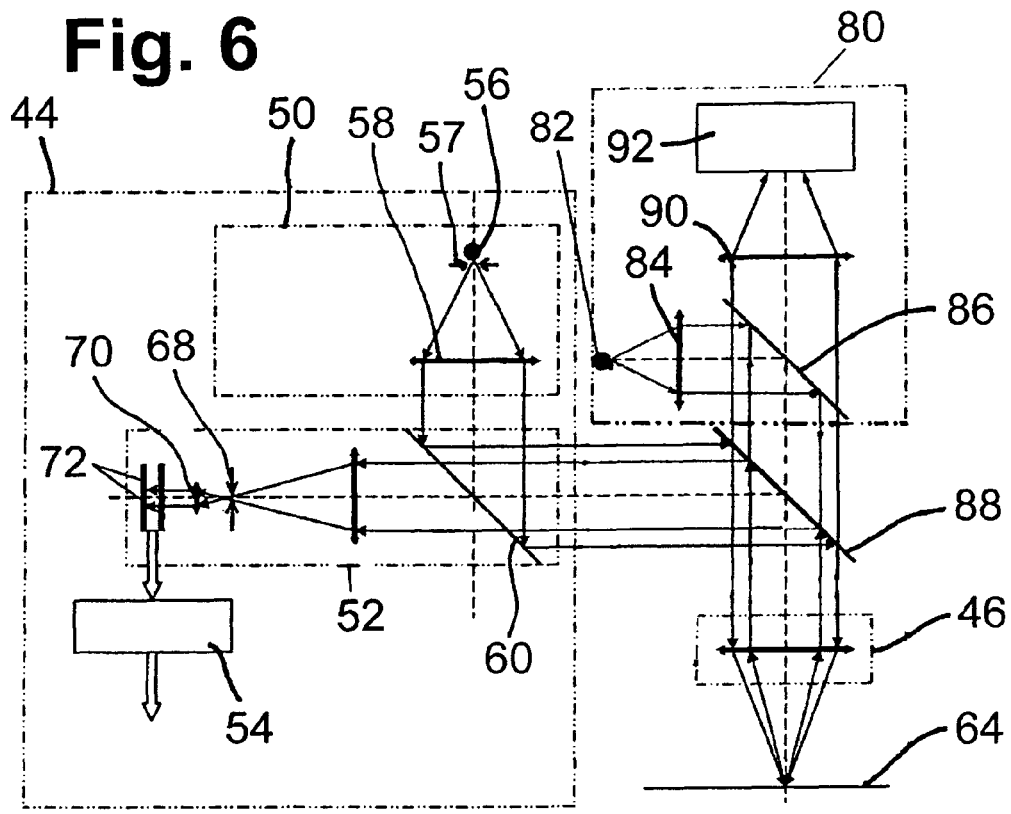
FIG. 6 shows a schematic block circuit diagram of the optical sensor device of FIG. 5.

Referring now to FIGS. 5 and 6, a second embodiment of an optical sensor device 38 of the present invention will be described in greater detail. In this case the same or similar components are identified by the same references as in the first embodiment of FIGS. 2 to 4 and they will not be described in detail here again.

The main components of the optical sensor device 38 of this embodiment are an optical sensor head 40, a video sensor 80, a beam splitter 88 and an objective 46. In this case, the optical sensor head 40 comprises a white light sensor 44 having a wideband radiation source 50, a wavelength-sensitive receiver 52 and a beam splitting means 60, in a way similar to that of the first embodiment. The video sensor 80 co-operates with an objective 46 which is a standard microscope objective, preferably.

The optical sensor head 40 and the video sensor 80 are combined in such a way that the beam path of the video sensor 80 passes through the same objective 46 as that of the white light sensor 44 of the optical sensor head 40. Preferably, the beam splitter 88 is arranged between the video sensor 80 and the objective 46, and the optical sensor head 40 is coupled to the beam splitter 88 so that the beam path of the white light sensor 44 of the optical sensor head 40 is reflected into that of the video sensor 80, as indicated in FIG. 5. It will be appreciated that alternatively it is also possible for the beam splitter to be arranged between the optical sensor head 40 and the objective 46 and for the beam path of the video sensor 80 to be reflected into that of the white light sensor 44 of the optical sensor head 40.

The combination of the optical sensor head 40 having a white light sensor 44 and the video sensor 80 is shown in greater detail in FIG. 6. For the sake of simplicity, however, the description of the white light sensor 44 will not be repeated here in detail.

The video sensor 80 has a light source 82 from which the light is directed by way of a lens 84 onto a beam splitter 86 by which the light is deflected in a direction towards the common objective 46. For integral coupling of the optical sensor head 40 and the video sensor 80, there is provided the further beam splitter 88 by which on the one hand the light from the light source 82 of the video sensor 80 and on the other hand the light of the white light source 50 of the white light sensor 44 of the optical sensor head 40 are guided to the objective 46 and the light reflected at the object to be measured is passed back to the respective detecting means 72, 92. As its receiver the video sensor 80 has a camera 92 (CCD, CMOS, CCD/CMOS), upstream of which is disposed a tube 90.

The video sensor 80 is not to be further described in the context of this invention as it has long been known to the man skilled in the art and the optical sensor device 38 according to the invention is not limited to the combination of the optical sensor head 40 with a specific video sensor 80.

The optical sensor 38 of this embodiment provides a compact unit having an optical sensor head 40 with a white light sensor 44 and a video sensor 80. In this case the white light sensor 44 can be used in particular as focussing means for the video sensor 80, while in contrast to the use of a laser sensor by virtue of the problem of speckle patterns which does not arise with the white light sensor it is possible to achieve a higher degree of measurement accuracy and the linear measurement range of the sensor permits scanning without readjustment of the z-coordinate axis. That results in a much higher scanning speed and accuracy.

In contrast to conventional constructions, the optical sensor head 40 comprising the white light sensor 44 is adapted to be used in combination with a standard objective 46 of a video sensor 80 of existing measuring and/or inspection apparatuses. That is because the white light sensor 44 comprises specially designed chromatic lens arrangements 58, 66 of the wideband radiation source 50 and the wavelength-sensitive receiver 52 which allow coupling of parallel light beams to an objective 46 mounted to a video sensor 80 of a conventional measuring and/or inspection apparatus.

Figure 7:
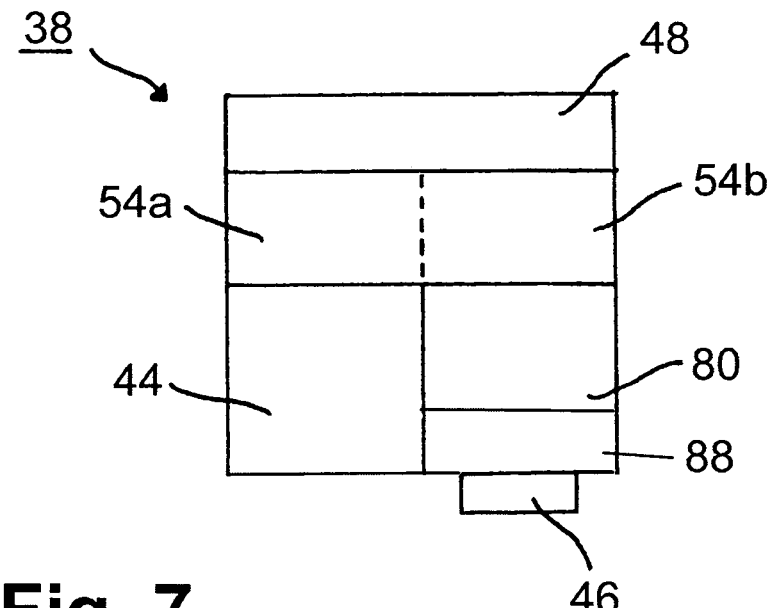
FIG. 7 shows a schematic block circuit diagram of the basic structure of an optical sensor device in accordance with a third embodiment of the present invention.

With reference to FIG. 7 a third embodiment of an optical sensor device 38 of the present invention will now be described in greater detail.

The optical sensor device 38 of the third embodiment is a combination of the optical sensor devices of the above-described first and second embodiments. In other words, the optical sensor device 38 has in particular a white light sensor 44 and a video sensor 80, the beam path of the white light sensor 44 passing through the same objective 46 as the beam path of the video sensor 80, by means of the beam splitter 88. In addition, the optical sensor device 38 includes an electronic control and evaluation means 54a for the white light sensor 44 and an electronic control and evaluation means 54b for the video sensor 80 or a common electronic control and evaluation means 54 for both sensors 44, 80. The specified components are all disposed in a compact light housing with an exchange adaptor 48.

The individual components and their advantages of this optical sensor device 38 have already been discussed in detail with reference to FIGS. 2 to 6 so that it is possible to dispense with a more detailed description at this juncture. The optical sensor device 38 shown in FIG. 7 combines not only the components of the first and second embodiments but naturally also the advantages thereof.

Figure 8:
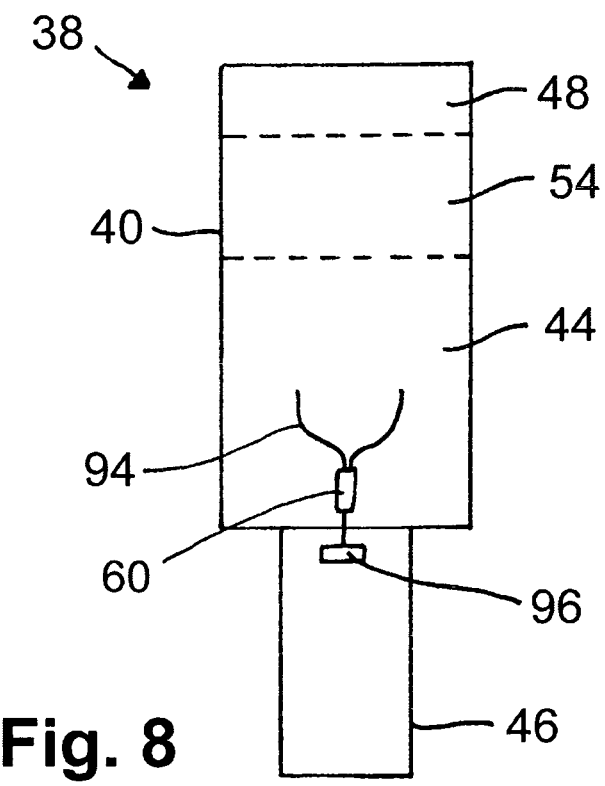
FIG. 8 shows a schematic block circuit diagram of the basic structure of an optical sensor device in accordance with a fourth embodiment of the present invention.
Figure 9:
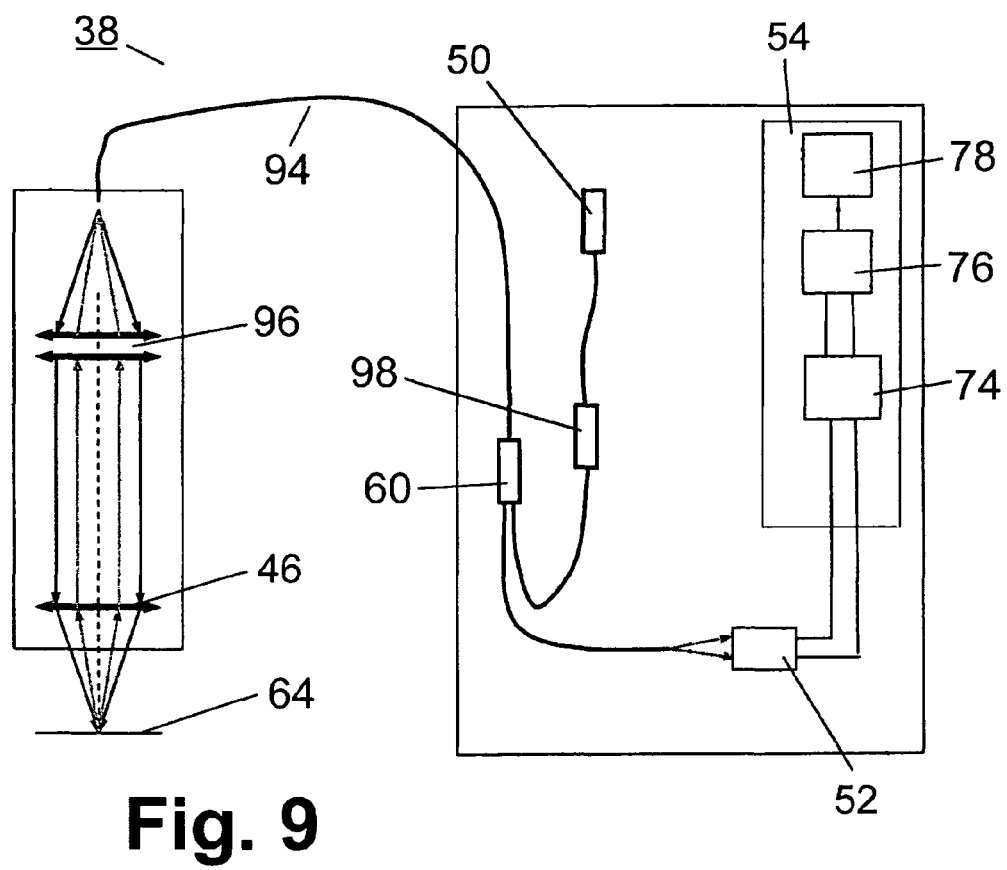
FIG. 9 shows a schematic block circuit diagram of the optical sensor device of FIG. 8.

Referring now to FIGS. 8 and 9, a fourth embodiment of an optical sensor device 38 of the present invention will now be described in greater detail. Especially, this optical sensor device 38 is an advantageous modification of the optical sensor device 38 according to the first embodiment shown in FIGS. 2 to 4.

As indicated in FIG. 8, the wideband radiation source 50 and the wavelength-sensitive receiver 52 of the white light sensor 44 of the optical sensor head 40 are coupled to the objective 46 by means of fiber optics 94 and a polychromatic lens arrangement 96.

By using the fiber optics 94 and the polychromatic lens arrangement 96 for coupling the optical components of the white light sensor 44 with the objective 46, the lens arrangements 58, 66 and the apertures 57, 68 of the light source 50 and the receiver 52, respectively, of the white light sensor 44 of the above-described first embodiment shown in FIG. 3 can be omitted. As a result, the optical sensor head 40 of the present embodiment becomes even more compact and light-weighted, and also becomes easier to manufacture, assemble and calibrate, respectively.

With reference to FIG. 9, the fourth embodiment of an optical sensor device of the invention is described in greater detail hereinafter.

The white light sensor 40 is coupled to the objective 46 by means of single mode fiber optics 94. The light guided through this fiber optics 94 illuminates a polychromatic lens arrangement 96 and passes through the objective (microscope objective lens) 46 to be focussed on a measuring plane 64, i.e. to be directed onto an object to be measured.

The focal length of the polychromatic lenses 96 depends on the wavelength of the light. In a preferred embodiment, the optical glass used for the first of the polychromatic lenses has the biggest deviation of refractive index for achieving the largest deviation of back focal length of this polychromatic lens arrangement 96. Further, the polychromatic lens arrangement 96 preferably comprises a first spherical lens for creating a chromatic aberration and a second spherical lens for removing a spherical aberration.

The white light sensor 44 of this optical sensor device has a wideband radiation source (referred to as a white light source) 50 and a wavelength-sensitive receiver 52. The electronic control and evaluation means 54 is coupled to the receiver 52 and e.g. corresponds to that described above with reference to FIG. 4.

The wideband radiation source 50 has in particular a superluminescence diode (SLED) for producing a polychromatic light beam (white light) of high light intensity per unit of area. The spectral bandwidth of the superluminescence diode used here is for example about 40 nm and the central wavelength is preferably in the range of between about 700 nm to 1500 nm, more preferably in the range between about 800 nm to 900 nm, and most preferably in the range between about 820 nm and 860 nm. The single mode fiber optics 94 for coupling the wideband radiation source 50 of the white light sensor 44 to the objective 46 preferably have a core diameter in the range of about 2 to 10 µm, more preferred of about 3 to 6 µm.

In a preferred embodiment, the central wavelength of the light emitted by the wideband radiation source 50 is e.g. about 0.84 µm, the core diameter of the fiber optics 94 is about 5 µm, the diameter of the optical fiber tip upstream the polychromatic lens arrangement 96 is about 4.5 µm, and the magnification of the objective 46 is about 10×.

The light reflected from the object to be measured is directed from the objective 46 to the wavelength-sensitive receiver 52 of the white light sensor 44 by means of the single mode fiber optics 94. To separate the illumination and receiving channels of the white light sensor 44 a fiber optic coupler 60 is arranged within the white light sensor 44 forming a beam splitting means for the fiber optics 94 coupled to the wideband radiation source 50 and the wavelength-sensitive receiver 52, respectively. To avoid reflected light beams to reach the wideband radiation source 50, preferably an optical isolator 98 allowing light only to pass in one direction therethrough is arranged between the fiber optic coupler 60 and the wideband radiation source 50.

The wavelength-sensitive receiver 52 comprises a wavelength-sensitive detecting means. That detecting means has for example two photodiodes or two photodiode regions of which one has a boosted response in the red range and the other in the blue range so that two photoelectric currents are produced proportionally to the wavelength of the incident light. The ratio of the two photoelectric current strengths depends only on the wavelength of the incident light so that the focus of the object plane 64 and thus the z-coordinate of a measurement point on an object to be measured can be determined from that measurement signal.

The measurement signals (photoelectric currents) produced by the wavelength-sensitive detecting means are passed to the electronic evaluation means 54 which is also integrated in the optical sensor head 40 of the optical sensor device. Preferably, the components of the receiver 52, the amplifiers 74 and the converters 76 are Peltier cooled.

The above-described white light sensor 44 with the white light source 50 and the wavelength-sensitive receiver 52 permits very precise and rapid coordinate detection of surfaces, without any problem, without being confused by speckles, as would be the case when using a laser sensor. Furthermore, by using the fiber optics 94 for coupling the optical components of the white light sensor 44 with the objective 46, further optical elements such as special lenses and apertures can be omitted. As a result, the optical sensor device of the present embodiment becomes even more compact and light-weighted and easier to assemble.

In the embodiment shown in FIGS. 8 and 9, the white light sensor 44, the objective 46, and the electronic control and evaluation means 54 are integrated into one optical sensor head 38, similar to the embodiment shown in FIGS. 2 to 4. Alternatively, the white light sensor 44 and the electronic control and evaluation means 54 may be separated. This means that all electric components of the optical sensor device are placed spaced apart from the optical components of the sensor head. As a result, the optical components of the sensor head cannot be influenced by heat produced from the electric components of the optical sensor device.

Figure 10:
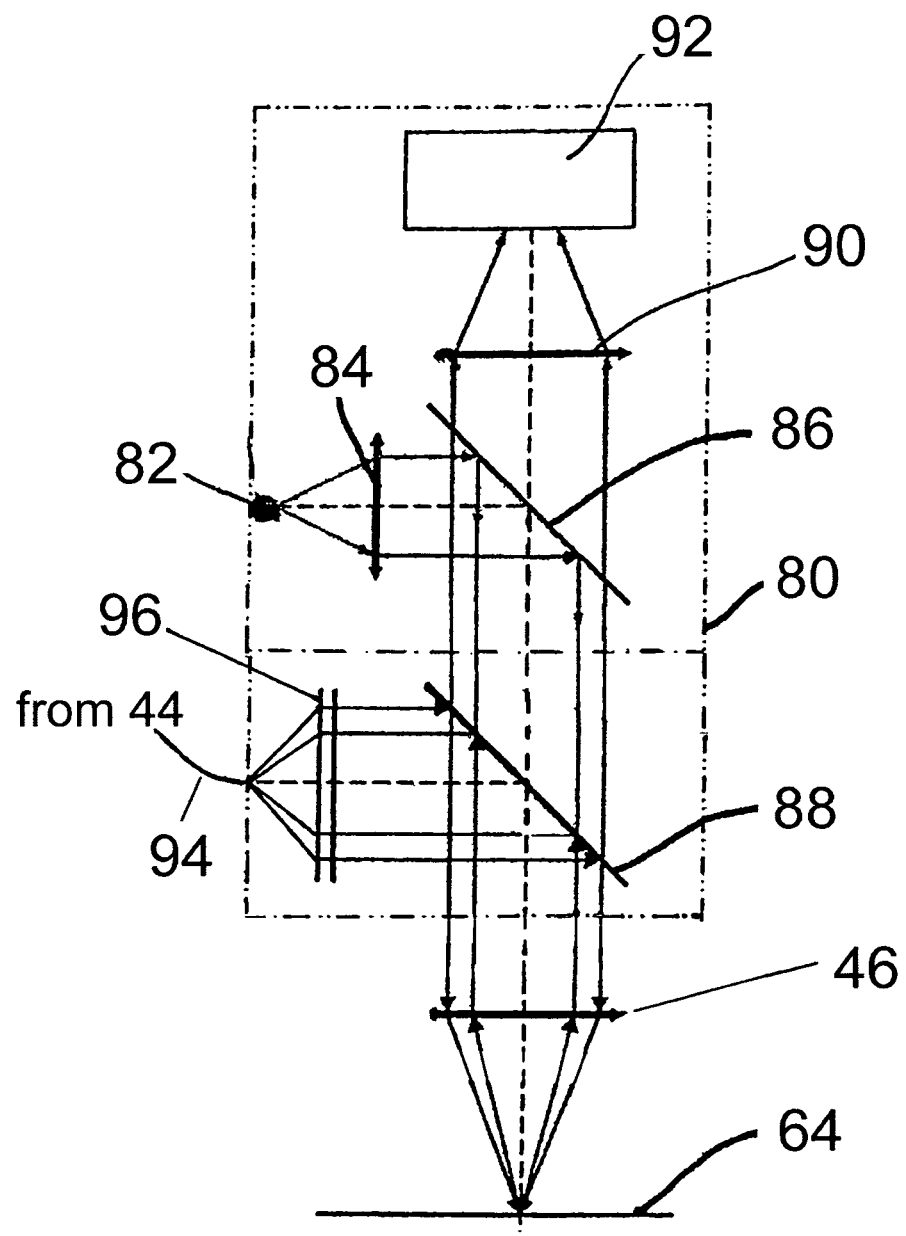
FIG. 10 shows a schematic block circuit diagram of an optical sensor device in accordance with a fifth embodiment of the present invention.

Referring now to FIG. 10, a further embodiment of an optical sensor device of the present invention will be described in greater detail. This embodiment is a combination of the second embodiment (FIGS. 2 to 4) and the fourth embodiment (FIGS. 8 and 9) explained above.

The essential of this optical sensor device are a white light sensor 44, a video sensor 80, an objective 46 and a beam splitting means 88. In this case the white light sensor 44 corresponds to that of the optical sensor device of the fourth embodiment above. The white light sensor 44 and the video sensor 80 are combined in such a way that the beam path of the white light sensor 44 passes through the objective 46 of the video sensor 80. In other words, the beam path of the video sensor 80 passes through the same objective 46 as that of the white light sensor 44.

To achieve this, the optical sensor device includes a beam splitter 88 being arranged between the video sensor 80 and the objective 46. The white light sensor 44 is coupled to the beam splitter 88 so that the beam path of the white light sensor 44 is reflected into that of the video sensor 80, as indicated in FIG. 10. In other words, the beam splitter 88 on the one hand guides the light from the light source 82 of the video sensor 80 and on the other hand guides the light of the white light sensor 44 to the objective 46 and the light reflected at the object to be measured is passed back to the respective receivers.

The present invention has been described in detail hereinbefore by reference to the use of the optical sensor device according to the invention in a multi-coordinate measuring and/or inspection apparatus without it being intended to be limited to that specific application. The optical sensor device of the invention can also be used in relation to other optical measuring and testing systems and can equally be employed in other apparatuses/devices. For example the optical sensor device with the white light sensor 40 can be used as measure sensor and/or autofocus for an apparatus/device for re-adjustment of a processing laser (for example YAG). Further possible uses of the optical sensor device will be immediately apparent to the man skilled in the art when studying the present document.

The invention claimed is:

1. An optical sensor device for use in a multi-coordinate measuring apparatus comprising:
   an optical sensor head including a white light sensor having a wideband radiation source, a wavelength-sensitive receiver and a beam splitting means; and
   an objective for directing a measuring beam onto an object to be measured and detecting a reflection beam reflected from the object to be measured,
   wherein said optical sensor device further comprises a video sensor;
   wherein a beam path of said video sensor passes through said same objective as that of said white light sensor of said optical sensor head, and
   wherein said wavelength-sensitive receiver of said white light sensor comprises a number of photodiodes or photodiode areas each having a boosted response within a respective range of wavelengths.

2. The optical sensor device according to claim 1, further comprising a beam splitter for reflecting the beam path of said white light sensor of said optical sensor head into the beam path of said video sensor, arranged between said video sensor and said objective.

3. The optical sensor device according to claim 1, further comprising:
   an electronic control and evaluation means for controlling said optical sensor head and evaluating measurement signals produced by said white light sensor of said optical sensor head.

4. The optical sensor device according to claim 3, wherein said electronic control and evaluation means includes one or more amplifiers for amplification of measurement signals produced by said wavelength-sensitive receiver of said white light sensor.

5. The optical sensor device according to claim 1, further comprising:
   an electronic control and evaluation means for controlling said video sensor and said optical sensor head and evaluating measurement signals produced by said video sensor and said white light sensor of said optical sensor head, respectively; and
   an exchange adaptor having connections for connecting said optical sensor device to a measuring and/or inspection apparatus.

6. The optical sensor device according to claim 1, wherein said wideband radiation source of said white light sensor comprises a superluminescence diode, an aperture and a chromatic lens arrangement; and
   said wavelength-sensitive receiver of said white light sensor comprises a chromatic lens arrangement, an aperture and a wavelength-sensitive measuring diode arrangement.

7. The optical sensor device according to claim 6, wherein said aperture of said wideband radiation source and said aperture of said wavelength-sensitive receiver each have a diameter of about 3 to 6 μm.

8. The optical sensor device according to claim 1, wherein a polychromatic lens arrangement is arranged between said objective and said beam splitting means of said white light sensor; and
   said wideband radiation source and said wavelength-sensitive receiver of said white light sensor are coupled to said polychromatic lens arrangement by means of fiber optics.

9. The optical sensor device according to claim 8, wherein said polychromatic lens arrangement comprises a first spherical lens for creating a chromatic aberration and a second spherical lens for removing a spherical aberration.

10. The optical sensor device according to claim 8, wherein said fiber optics have a core diameter in the range of about 2 to 10 μm.

11. The optical sensor device according to claim 8, wherein said beam splitting means is formed as a fiber optics coupler.

12. The optical sensor device according to claim 8, wherein an optical isolator is arranged between said beam splitting means and said wideband radiation source for allowing the light only to pass in a direction from said wideband radiation source to said beam splitting means.

13. The optical sensor device according to claim 1, wherein said wideband radiation source of said white light sensor comprises one of a superluminescence diode or a plurality of superluminescence diodes having different wavelengths of radiation.

14. An optical sensor device for use in a multi-coordinate measuring apparatus comprising:
   an optical sensor head including a white light sensor having a wideband radiation source, a wavelength-sensitive receiver and a beam splitting means, and an objective coupled to said white light sensor for directing a measuring beam onto an object to be measured and detecting a reflection beam reflected from the object to be measured,
   wherein said optical sensor head further includes:
   an electronic control and evaluation means for controlling said white light sensor and evaluating measurement signals produced by said white light sensor; and
   an exchange adaptor having connections for connecting said optical sensor head to a measuring and/or inspection apparatus,
   wherein said wavelength-sensitive receiver of said white light sensor comprises a number of photodiodes or photodiode areas each having a boosted response within a respective range of wavelengths.

15. The optical sensor device according to claim 14, wherein said electronic control and evaluation means includes one or more amplifiers for amplification of measurement signals produced by said wavelength-sensitive receiver of said white light sensor.

16. The optical sensor device according to claim 14, wherein
   said wideband radiation source of said white light sensor comprises a superluminescence diode, an aperture and a chromatic lens arrangement; and
   said wavelength-sensitive receiver of said white light sensor comprises a chromatic lens arrangement, an aperture and a wavelength-sensitive measuring diode arrangement.

17. The optical sensor device according to claim 16, wherein said aperture of said wideband radiation source and said aperture of said wavelength-sensitive receiver each have a diameter of about 3 to 6 μm.

18. The optical sensor device according to claim 14, wherein
   a polychromatic lens arrangement is arranged between said objective and said beam splitting means of said white light sensor; and
   said wideband radiation source and said wavelength-sensitive receiver of said white light sensor are coupled to said polychromatic lens arrangement by means of fiber optics.

19. The optical sensor device according to claim 18, wherein said polychromatic lens arrangement comprises a first spherical lens for creating a chromatic aberration and a second spherical lens for removing a spherical aberration.

20. The optical sensor device according to claim 18, wherein said fiber optics have a core diameter in the range of about 2 to 10 μm.

21. The optical sensor device according to claim 18, wherein said beam splitting means is formed as a fiber optics coupler.

22. The optical sensor device according to claim 18, wherein an optical isolator is arranged between said beam splitting means and said wideband radiation source for allowing the light only to pass in a direction from said wideband radiation source to said beam splitting means.

23. The optical sensor device according to claim 14, wherein said wideband radiation source of said white light sensor comprises one of a superluminescence diode or a plurality of superluminescence diodes having different wavelengths of radiation.

* * * * *